(12) United States Patent
Gschwind et al.

(10) Patent No.: US 7,849,241 B2
(45) Date of Patent: Dec. 7, 2010

(54) MEMORY COMPRESSION METHOD AND APPARATUS FOR HETEROGENEOUS PROCESSOR ARCHITECTURES IN AN INFORMATION HANDLING SYSTEM

(75) Inventors: Michael Karl Gschwind, Chappaqua, NY (US); Barry L Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 11/387,999

(22) Filed: Mar. 23, 2006

(65) Prior Publication Data

US 2007/0245097 A1    Oct. 18, 2007

(51) Int. Cl.
G06F 13/38      (2006.01)
G06F 15/16      (2006.01)
G06F 13/00      (2006.01)

(52) U.S. Cl. .................... 710/68; 709/201; 711/170; 712/10

(58) Field of Classification Search .................... 710/68
See application file for complete search history.

(56) References Cited

U.S. PATENT DOCUMENTS

| | | | | |
|---|---|---|---|---|
| 5,237,675 A | * | 8/1993 | Hannon, Jr. .................. | 710/68 |
| 5,479,587 A | * | 12/1995 | Campbell et al. .......... | 358/1.17 |
| 5,729,228 A | | 3/1998 | Franaszek | |
| 5,812,817 A | * | 9/1998 | Hovis et al. ................. | 711/173 |
| 5,864,859 A | | 1/1999 | Franaszek | |
| 6,240,419 B1 | | 5/2001 | Franaszek | |
| 6,549,995 B1 | * | 4/2003 | Schulz et al. ............... | 711/202 |
| 6,879,270 B1 | * | 4/2005 | Veazey ........................ | 341/87 |
| 7,024,512 B1 | * | 4/2006 | Franaszek et al. .......... | 711/100 |
| 7,302,543 B2 | * | 11/2007 | Lekatsas et al. ............. | 711/170 |
| 7,480,489 B2 | * | 1/2009 | Eslick et al. .................. | 455/72 |
| 7,548,586 B1 | * | 6/2009 | Mimar ................... | 375/240.26 |
| 2004/0141650 A1 | * | 7/2004 | Hansson et al. ............. | 382/232 |
| 2004/0162942 A1 | * | 8/2004 | Lee et al. ..................... | 711/117 |
| 2005/0062746 A1 | * | 3/2005 | Kataoka et al. ............. | 345/505 |
| 2006/0069879 A1 | * | 3/2006 | Inoue et al. ................. | 711/147 |

FOREIGN PATENT DOCUMENTS

WO    WO2004092913 A2    10/2004

OTHER PUBLICATIONS

Abali—MXT Software Support & Performance—IBM JRD (Mar. 2001).
Armstrong—Advanced Virtualization of POWER5 Systems—IBM JRD (Jul. 2005).

(Continued)

Primary Examiner—Henry W Tsai
Assistant Examiner—Michael Sun
(74) Attorney, Agent, or Firm—Matt Talpis; Mark P Kahler (57) ABSTRACT

The disclosed heterogeneous processor compresses information to more efficiently store the information in a system memory coupled to the processor. The heterogeneous processor includes a general purpose processor core coupled to one or more processor cores that exhibit an architecture different from the architecture of the general purpose processor core. In one embodiment, the processor dedicates a processor core other than the general purpose processor core to memory compression and decompression tasks. In another embodiment, system memory stores both compressed information and uncompressed information.

8 Claims, 7 Drawing Sheets

OTHER PUBLICATIONS

Rambus Flex O Processor Bush Product Brief—Rambus—(Sep. 19, 2005).
Franaszek—Algorithms & Data Structures For Compressed Memory. Machines—IBM JRD (Mar. 20, 2001).
Franaszek—On Internal Organization in Compressed RAM—IBM JRD (Mar. 2001).
Harper—Preface—IBM JRD (Mar. 2001).
Huffman—"A Method for the Construction of Minimum-Redundancy Codes", Proceedings of the IRE, vol. 40, p. 1098 (1952).
IBM—Cell Broadband Engine Architecture—(pp. 1-319) (Aug. 2005).
Kahle—Intro to the Cell Multiprocessor—IBM JRD (Jul. 2005).
Marketwire—IBM First To Deliver Memory Breakthrough in Servers (Feb. 11, 2002).
Nanda—High Throughput Coherence Control & HW Messaging in Everest—IBM JRD (Mar. 2001).
Page—IBM's Cell Processor; Preview to Greatness? (May 15, 2005).
Rissanen—Generalized Kraft Inequality and Arithmetic Coding IBM JRD (May 1976).
Smith—MXT Competitive Impact—IBM JRD (Mar. 2001).
Tremaine—IBM Memory Expansion Technology (MXT)—IBM JRD (Mar. 2001).
Truduce—Adaptive Main Memory Compression—USENIX—(2005).
Rambus—XDR Technology Summary—Rambus—(Sep. 19, 2005).
Ziv—A Universal. Algorithm For Seq. Data Comp.—IEEE Trans. Info. Theory—vol. IT-23, No. 3, (May 1977).
Ziv—Compression of Individual Sequences via Variable Rate Coding—IEEE T. Info Theory—vol. IT-23, No. 3, (Sep. 1978).

* cited by examiner

INCREASE COMPRESSION

FIG. 8

DECREASE COMPRESSION

MEMORY COMPRESSION METHOD AND APPARATUS FOR HETEROGENEOUS PROCESSOR ARCHITECTURES IN AN INFORMATION HANDLING SYSTEM

TECHNICAL FIELD OF THE INVENTION

The disclosures herein relate generally to memory systems, and more particularly, to information handling systems that employ memory systems using memory compression.

BACKGROUND

Memory bandwidth and memory capacity are major concerns in modern information handling system architectures. The cost of memory may form a very substantial portion of the overall cost of an information handling system. Moreover, it is increasingly difficult for memory systems to deliver the data volume required by high performance information handling systems. This condition occurs because physical constraints such as power dissipation and the memory module area available for pin placement limit both memory signalling speeds and the number of signalling pins of memory modules.

In another aspect of system memory architecture, memory capacity impacts information handling system design and performance in at least two ways. Low cost information handling systems are limited in the amount of physical memory included in such systems. In high-end information handling systems, performance scales with the ability to store high data volumes in low latency storage such as main memory.

Data compression techniques provide an attractive solution for these design challenges. More particularly, data compression may increase the effective memory size for a given amount of physical storage capacity. Unfortunately, conventional data compression methodologies for memory systems tend to involve expensive, high complexity circuitry such as special purpose chip sets. For example, such an approach may employ a special purpose memory controller with memory compression for use in conjunction with a largely unmodified system architecture. To speed up compression and decompression, such a conventional memory system may store uncompressed data in a cache memory and compressed data in a main system memory. In this case, a special purpose memory controller controls the compression and decompression of data passing between the cache memory and the main system memory. Such a special purpose memory controller results in additional system complexity and cost.

What is needed is a memory compression method and apparatus that address the problems discussed above.

SUMMARY

Accordingly, in one embodiment, a method is disclosed for compressing and decompressing information in a heterogeneous multi-core processor. The method includes processing information by a first processor core exhibiting a first architecture and processing information by a second processor core exhibiting a second architecture. The method also includes compressing, by the second processor core, information to be sent by the heterogeneous multi-core processor to a system memory for storage therein as compressed information. The method further includes decompressing, by the second processor core, compressed information received from the system memory for use as uncompressed information by the heterogeneous processor. In one embodiment, the first architecture is a general purpose processor core and the second architecture is a special purpose processor core that performs tasks assigned by the first processor core. In another embodiment, the method includes storing, by the heterogeneous multi-core processor, both compressed information and uncompressed information in the system memory.

In another embodiment, a heterogeneous multi-core processor is disclosed that includes a first processor core exhibiting a first architecture. The processor also includes a second processor core exhibiting a second architecture that compresses information to provide compressed information and that decompresses compressed information to provide uncompressed information. The processor further includes a bus coupling the first processor core to the second processor core, the bus being adapted to communicate the compressed information and uncompressed information to and from a system memory. In one embodiment, the first architecture is a general purpose processor core and the second architecture is a special purpose processor core that performs tasks assigned by the first processor core. In another embodiment, the heterogeneous multi-core processor stores both compressed information and uncompressed information in the system memory.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Special purpose compression engines in information handling systems (IHSs) tend to be complex and expensive. IHSs that employ memory compression may take the form of desktop, server, portable, laptop, notebook, mainframe, minicomputer or other form factor IHS. For example, an IHS employing memory compression may take on other form factors such as a personal digital assistant (PDA), a gaming device, a portable telephone device, a communication device or other devices that include a processor and memory. A custom memory controller with memory compression is an example of a special purpose compression engine. The IBM memory expansion technology (MXT) employs such a special purpose compression engine—Tremaine, et al., "IBM Memory Expansion Technology (MXT)", IBM JRD, Vol. 45, No. 2, March 2001. In Tremaine, et al., two processors share a common shared L3 cache memory that couples to main memory. Main system memory stores compressed data whereas the shared cache memory stores uncompressed data. Special logic-intensive compressor and decompressor hardware engines both compress and decompress data as it moves between the shared cache and main memory. As described above, such special purpose memory compression systems tend to be complex and expensive.

Figure 1:
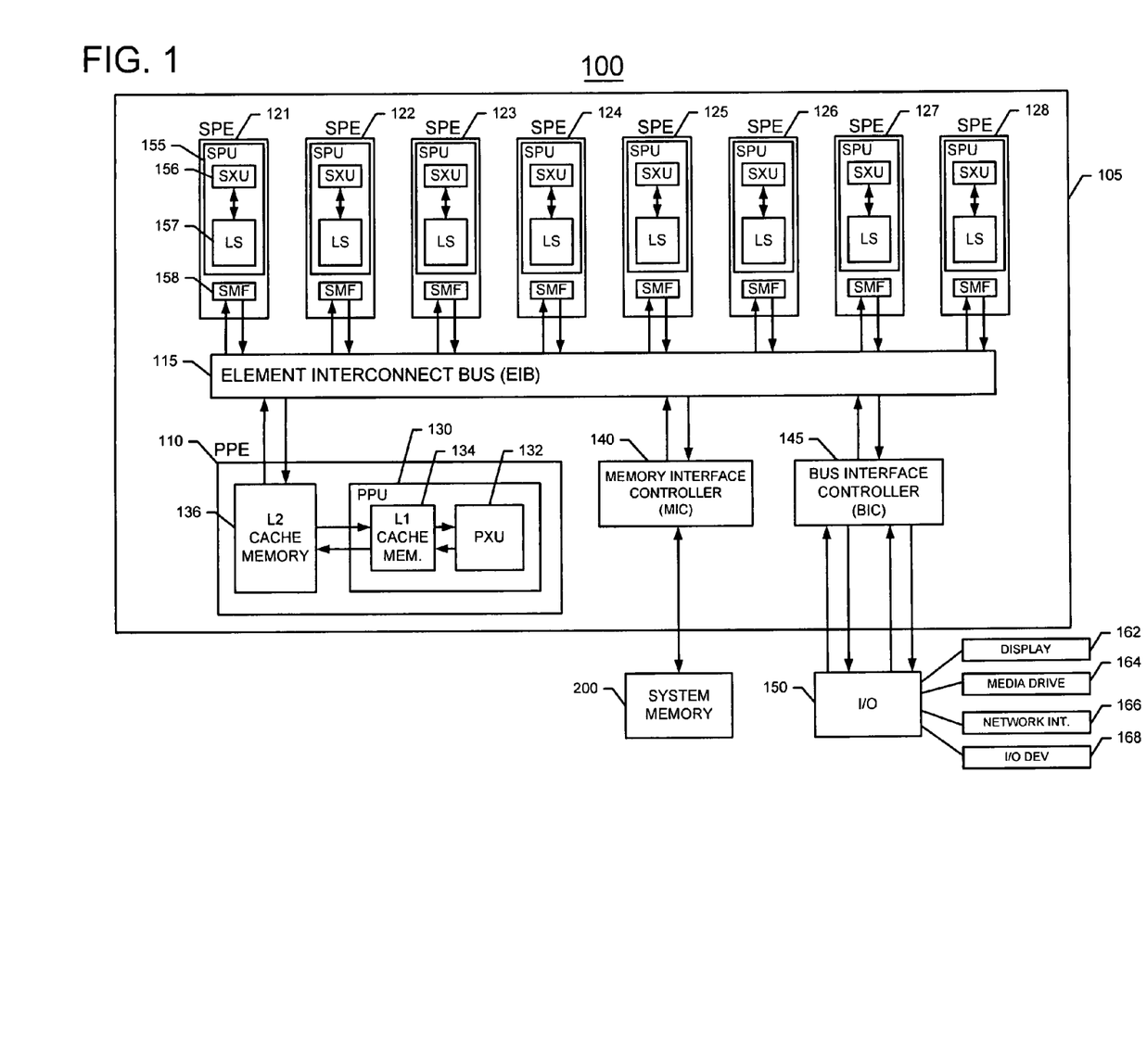
FIG. 1 shows a block diagram of an information handling system (IHS) employing a processor that uses the disclosed memory compression technology.

FIG. 1 shows an information handling system 100 employing a processor 105 that uses the disclosed memory compression technology. In one embodiment, processor 105 employs the processor architecture described in the publication "Cell Broadband Engine Architecture", Version 1.0, by IBM Corp, Sony and Toshiba, Aug. 8, 2005, the disclosure of which is incorporated herein by reference in the entirety. In one embodiment, processor 105 is a heterogeneous processor, namely a processor including at least one general processor unit having a first instruction set and at least one other processor unit having an architecture and instruction set different from that of the general purpose processor. For example, the other processor may be a specialized processor unit or special purpose processor. In the particular embodiment shown in FIG. 1, processor 105 includes a general processor unit 110, for example a Power PC Processor Element (PPE) employing a RISC instruction set, coupled via an element interconnect bus (EIB) 115 to eight synergistic processor elements (SPEs) employing a single instruction multiple data (SIMD) instruction set, namely processors 121, 122, . . . 128. More particularly, PPE 110 includes a PowerPC processor unit (PPU) 130 having a processor unit (PXU) 132 coupled to an L1 cache memory 134 therein. An L2 cache memory 136 couples to L1 cache memory 134 as shown. A memory interface controller 140 couples EIB 115 to a system memory 200. A bus interface controller (BIC) 145 couples processor 105 to an I/O hub 150. I/O hub 150 couples to I/O devices such as a display 162, a media drive 164, a network interface 166, or other I/O device 168. In one embodiment, media drive 164 provides non-volatile storage for an operating system, software applications and other information. Network interface 166 provides wired or wireless communications between IHS 100 and other IHSs.

In one embodiment, PPE 110 controls processor tasks and SPEs 121, 122, . . . 128 perform data intensive processing tasks assigned by PPE 110. SPEs 121-128 are available to act as accelerators for tasks such as information compression, information decompression as well as other information handling tasks. A representative SPE 121 includes at least one synergistic processor unit (SPU) 155. SPU 155 includes a synergistic processing unit (SXU) 156 coupled to local storage (LS) 157. SPU 155 further includes at least one synergistic memory flow control (SMF) 158 that couples to element interconnect bus (EIB) 115 as shown. Remaining SPEs 122, 123 . . . 128 include structures similar to those of representative SPE 121. In one embodiment, processor 105 is a heterogeneous multi-core processor, namely a processor including 2 different types of processor units. In one embodiment, PPE 110 is a general purpose flexible processor core whereas representative SPE 121 may be more specialized in the sense that SPE 121 does not handle external interrupts and it does not handle full addressability to memory. In other words, SPE 121 may access its own local store memory 157, but must request PPE 110 for assistance in accessing memory 200.

Figure 2:
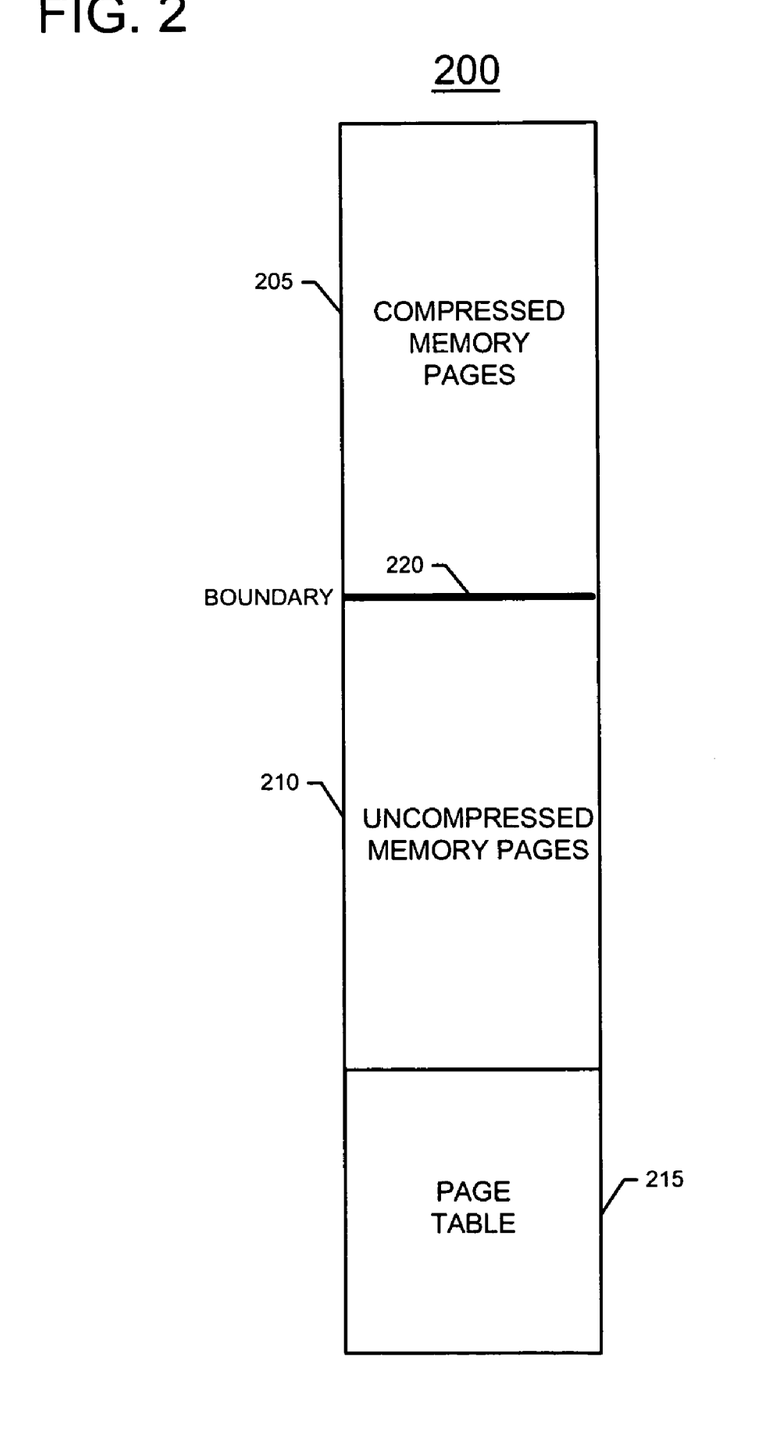
FIG. 2 shows a representation of a partitioned system memory.

FIG. 2 shows a representation of system memory 200. IHS 100 partitions system memory 200 into compressed memory pages 205 and uncompressed memory pages 210. System memory 200 also includes a page table that includes information regarding the location of compressed and uncompressed information in system memory 200. Thus, FIG. 2 provides a memory map of system memory 200 in an IHS 100 that provides memory compression. In one embodiment, the same memory chip 200 stores both compressed and uncompressed data. Storing compressed and uncompressed data in a common memory 200 advantageously eliminates the cost of maintaining a separate memory area for each type of data. Processor 105 stores frequently used data in uncompressed form in system memory 200 and also stores less frequently used data in system memory 200 in compressed form. This technique reduces memory latency, namely the time required to access data in memory. As discussed in more detail below, IHS 100 employs one of many acceptable algorithms to compress and decompress data. For example, IHS 100 may employ one or more of the Huffman coding [Huffman 52], Lempel-Ziv (LZ) data compression [Ziv 77, 78], and arithmetic coding [Rissanen 76] algorithms to compress data as described in the publications: [Huffman 52] Huffman, D. A., A Method for the Construction of Minimum Redundancy Codes, Proc. IRE, Vol. 40, pp. 1098-1102, 1952; [Ziv 77] Ziv, J., and A. Lempel, A Universal Algorithm for Sequential data Compression, IEEE Trans. Information Theory, Vol. IT-23, No. 3, pp. 337-343, 1977; [Ziv 78] Ziv, J., and A. Lempel, Compression of Individual Sequence via Variable-Rate Coding, IEEE Trans. Information Theory, Vol. IT-24, No. 5, pp. 530-536, 1978; and [Rissanen 76] Rissanen, J. J., Generalized Kraft Inequality and Arithmetic Coding, IBM J. Res. Develop., Vol. 20, No. 3, pp. 198-203, 1976, all of which are incorporated herein in their entirety. Those skilled in the art will understand that processor 105 may employ currently existing or future compression algorithms for compression and decompression operations In one embodiment, a special purpose or programmable core such as SPE 121 provides compression services to a general purpose processor core such as PPE 110. More particularly, SPE 121 may provide compression services by acting as a programmable accelerator or a custom accelerator. In one embodiment, the SPE is a highly optimized data processing engine that provides a platform for providing compression and decompression services within processor 105. At least one SPE provides compression services. In one embodiment, the compression accelerator of SPE 121 provides compression services only to the PPE. In other embodiments, the compression accelerator in one SPE provides compression services to PPE 110 and other processor cores in processor 105. In one embodiment, a single SPE may provide compression services to the entire information handling system (IHS) 100. However, the SPEs 121-128 include wider data paths than PPE 110 and the SPEs excel in data processing intensive tasks such as compression, decompression, encryption, decryption, coding and decoding MPEG media streams, for example.

Figure 3:
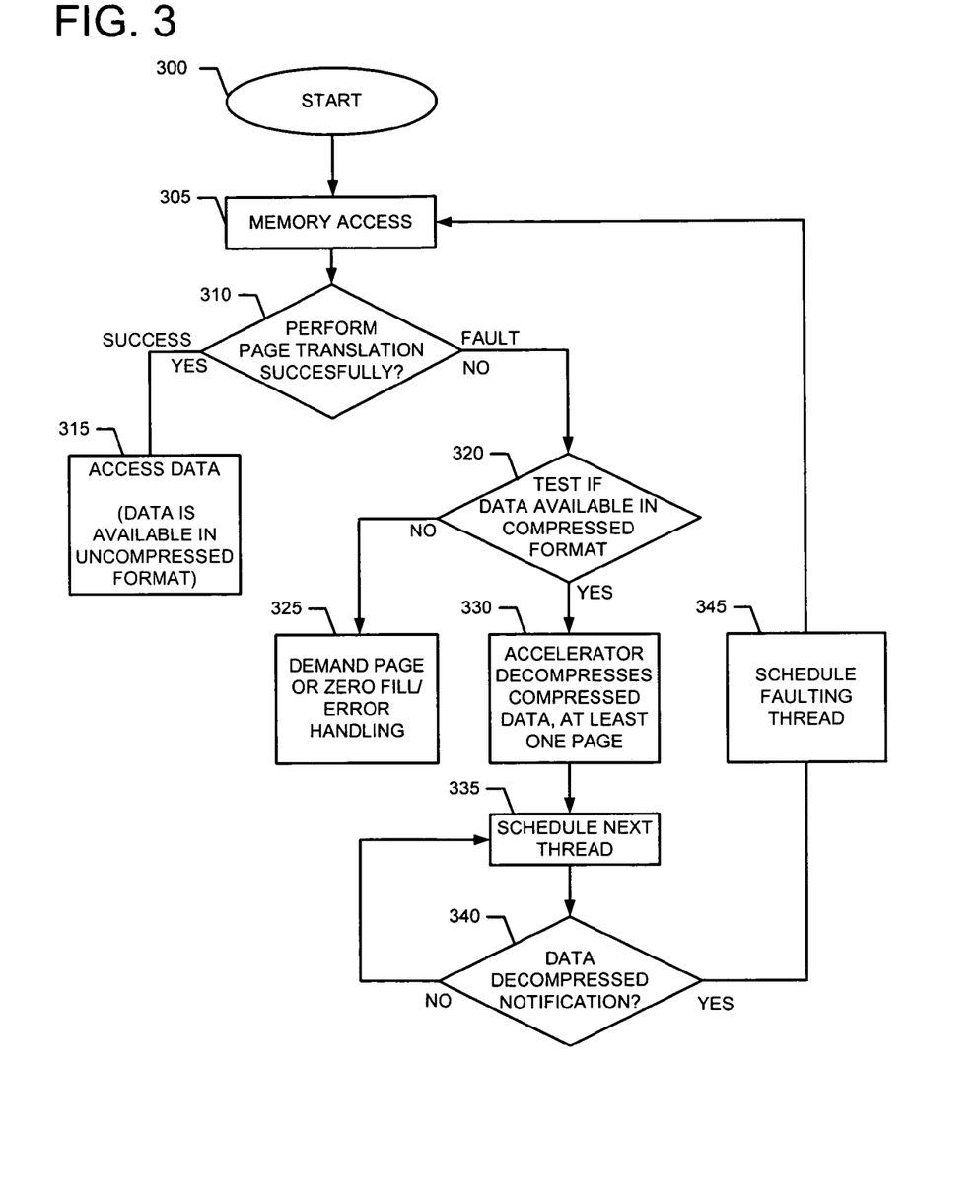
FIG. 3 shows a flowchart depicting memory decompression methodology.

FIG. 3 is a flowchart that depicts the methodology implemented by the accelerator in SPE 121 to handle memory decompression tasks under the control of PPE 110. In this example, a dedicated SPE 121 acts as an accelerator to facilitate access to a page stored in compressed form in system memory 200. Process flow starts at start block 300. Subsequently, a thread in a software application or a thread in the operating system (OS) attempts a system memory access, as per block 305. For example, PPE 110 attempts a memory access in the course of executing a thread in an application or OS. In response, one of a memory management unit (MMU) contained in PXU 132, and a memory management unit contained in SMF 158 attempts to perform a page translation to access the requested data in system memory 200. Decision block 310 conducts a test to determine if page translation is successful. If page translation is successful, then memory 200 includes the requested data in uncompressed format and memory access to the requested data proceeds without the need for decompression, as per block 315. However, if page translation is not successful because the requested page does not have a page table entry in page table 215, then either the requested data exists in memory 200 in compressed format or a real page fault exists. In a preferred embodiment, processor 105 raises an exception and control passes to an exception handler software component. To determine whether the requested data exists in memory 200 in compressed format or a real page fault exists, decision block 320 performs a test to determine if the requested data is available in compressed format. More particularly, PXU 132 may execute a software program performing this test. If decision block 320 determines that the requested data is not available in compressed format, then PPE 110 performs actions appropriate for cases wherein data is not available from memory, as per block 325. For example, if the data is not currently available in uncompressed format, the data may be present in a disk or other non-volatile storage 164 in IHS 100. In that case, IHS 100 accesses the requested data in non-volatile storage by demanding the page in non-volatile storage 164 that includes the requested data. In another aspect of page fault handling, processor 105 initializes pages corresponding to zero-initialized data in response to a page fault by an exception handler software component that implements page fault service. In yet another aspect of page fault handling, an application accesses an illegal (i.e., protected) address, and an error notification is delivered.

However, if decision block 320 determines that the requested data is currently available in memory 200 in compressed format, then one of SPEs 121-128 acts as a compression/decompression accelerator to decompress the requested compressed data in system memory 200. In this example, SPE 121 is dedicated to compression/decompression activities and acts as an accelerator to carry out these activities. In one embodiment, PPE 110 directs system memory 200 to send a copy of the compressed page including the requested compressed data to SPE 121. PPE 110 may then instruct SPE 121 to act as an accelerator to decompress at least this selected compressed page, as per block 330. To decompress the compressed information, SPE 121 uses whatever algorithm SPE 121 used earlier to compress that information. In one embodiment, SPE 121 also decompresses one or more of the pages before the selected compressed page and after the selected compressed page so that these pages are available should SPE 121 need them at a later time. While SPE 121 performs decompression activities, PPE 110 is free to perform other computing activities.

After decompressing the requested information or during such decompression, PPE 121 schedules the next thread to execute, as per block 335. When the accelerator provided by SPE 121 completes decompression of the currently requested data, SPE 121 issues a data decompressed notification. Decision block 340 tests to determine if SPE 121 issued the data decompressed notification. If decision block 340 concludes that SPE 121 did not yet issue the data decompressed notification, then process flow continues back to block 335 which schedules the next thread that PPE 110 should execute. In one embodiment, PXU 132 includes a load/store unit (LSU, not shown) that implements the memory access process of block 305. This LSU may also implement the page translation of block 310 and the data access of block 315. An operating system and software running on processor 105 may implement blocks 320-345 in response to the MMU in PXU 132 raising a page fault exception. Those skilled in the art will understand that different partitionings of these functions are possible. When decision block 340 determines that SPE 121 issued the data compressed notification, then PPE 110 or another SPE schedules the faulting thread for execution, as per block 345. Here the faulting thread means the thread which required access to compressed data which SPE 121 has now successfully decompressed and which awaits execution or other processing. Process flow then continues back to block 305 at which another memory access commences.

In summary, when PPE 110 or a memory flow controller such as SMF 158 accesses a compressed page which is resident in memory 200, page table 215 does not reference such compressed requested information and thus the MMU associated with PPE 110 or SMF 158 generates a page fault exception which causes the PPE 110 to enter the exception handler software component. Page table 215 contains references to uncompressed pages in system memory 200, not compressed pages. PPE 110 receives the resultant page fault exception. Software executing on PPE 110 attempts to retrieve a compressed page including the requested information from system memory 200. To accomplish this task, PPE 110 copies the compressed page from compressed memory 205 in system memory 200 via a DMA request. PPE 110 then initiates decompression of the compressed page by providing the compressed page to SPE 121 and instructing SPE 121 to act as an accelerator to decompress the compressed page. SPE 121 notifies PPE 110 when SPE 121 completes the decompression task. PPE 110 then retrieves the decompressed information and stores the decompressed information in uncompressed memory pages 210. However, if the requested information is neither in the compressed memory pages 205 nor the uncompressed memory pages 210, then processor 105 performs demand paging in an attempt to retrieve the requested information from non-volatile storage 164 such as a hard disk or other media drive. If the requested information is not available via such demand paging, then a real fault or exception exists. In response to such a real fault, processor 105 generates an error notification or otherwise handles the error by conventional error handling methods.

Processor 105 thus offloads memory compression and decompression functions from PPE 110 to an SPE. In one embodiment, processor 105 reduces the PPE overhead of initiating memory transfers and decompression steps by allocating an SPE as a page decompression service. An SPE such as SPE 121 acts as a dedicated compression/decompression accelerator. SPE 121 may perform predictive decompression. For example, SPE 121 decompresses a demand-requested page and at least the page following the demand-requested page. Under locality of reference principles, it is likely that a subsequent memory access will use the page following the demand-requested page. Advantageously, when PPE 110 later needs the page following the demand-requested page, the page already exists in decompressed format. Those skilled in the art will understand that other predictive methods may also be used wherein the SPU implements one or more algorithms to determine whether to perform predictive decompression.

Processor 105 may configure SPE 121 permanently as a decompressor, or alternatively, may configure SPE 121 or another SPE as a decompressor when the need for decompressing information arises. In the latter case, an SPE that previously performed a decompression task may perform other activities until another decompression task occurs. In other words, processor 105 may configure an SPE as a dedicated decompressor or as an on-demand decompressor. Likewise, processor 105 may configure an SPE as a dedicated compressor or as an on-demand compressor. Moreover, processor 105 may configure an SPE as a dedicated compressor/decompressor.

Figure 4:
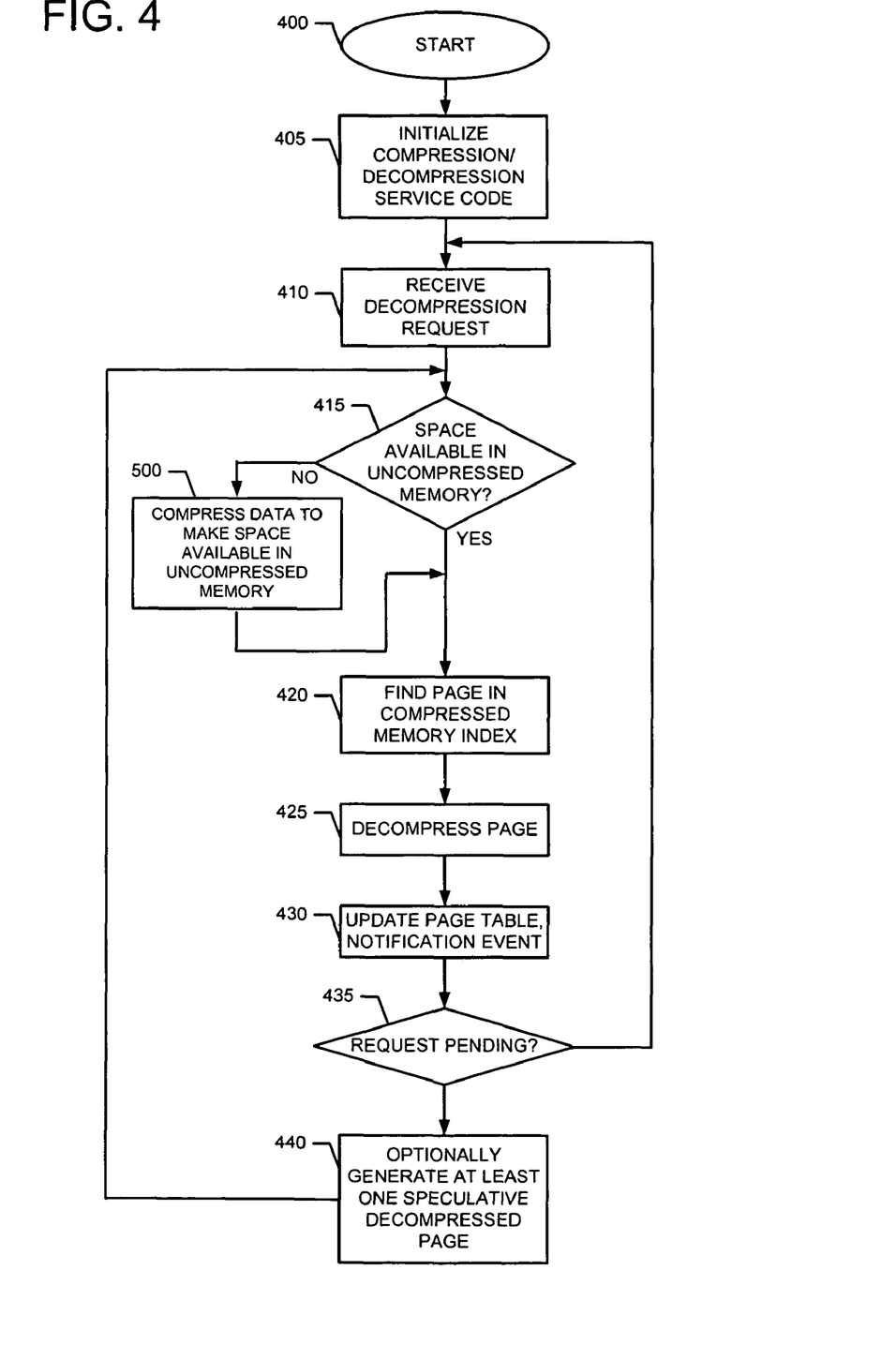
FIG. 4 shows a flowchart showing more aspects of memory decompression methodology.

FIG. 4 is a flowchart that depicts the methodology implemented by the accelerator in SPE 121 when processor 105 dedicates SPE 121 to acceleration tasks such as compression and decompression. Process flow begins at start block 400. PPE 110 initializes compression/decompression code in SPE 121 thus making SPE 121 ready for compression or decompression tasks, as per block 405. SPE 121 then receives a decompression request, as per block 410. PPE 110 or SPE 121 performs a test to determine if space is currently available in uncompressed memory 210 for storage of the information that SPE 121 will decompress in response to the decompression request, as per block 415. If space is not currently available in uncompressed memory 210, then SPE 121 compresses data in uncompressed memory 210 and transfers the information thus compressed to compressed memory 205, as per block 500. This action frees up space in uncompressed memory 210. When space becomes available in uncompressed memory 210, process flow continues to block 420. At block 420, PPE 110 or SPE 121 finds the requested page in a compressed memory index in system memory 200 at which the requested compressed information is located. In one embodiment, system memory 200 stores the compressed memory index. In another embodiment, SPE local store 157 stores the compressed memory index, or a portion of the compressed memory index. Storage of the compressed memory index in this manner reduces access latency but causes a size limitation due to the limited local store memory size. In one embodiment, local store 157 caches a portion of the compressed memory index to improve access speed. SPE 121 then decompresses the requested compressed page, as per block 425. In response to SPE 121 decompressing the requested compressed page, PPE 110 or SPE 121 (using SMF 158) updates the page table 215 in memory 200 and issues a notification to indicate that uncompressed memory 210 now contains the requested page, as per block 430. PPE 110 or SPE 121 then tests to determine if another decompression request is pending, as per block 435. If another decompression request is pending, then process flow continues back to block 410 to handle that request. However, if another decompression request is not pending, SPE 121 may optionally speculatively decompress a page adjacent the page that SPE 121 last decompressed, as per block 440. Process flow then continues back to decision block 415 and the process continues as before. In one embodiment, when processor 105 decompresses a page, processor 105 stores the decompressed page in uncompressed memory 210. Page table 215 includes entries for all uncompressed pages stored in uncompressed memory 210. However, page table 215 includes no entries for compressed pages in one embodiment. Instead the compressed memory index keeps track of compressed pages stored in compressed memory 205.

Figure 5:
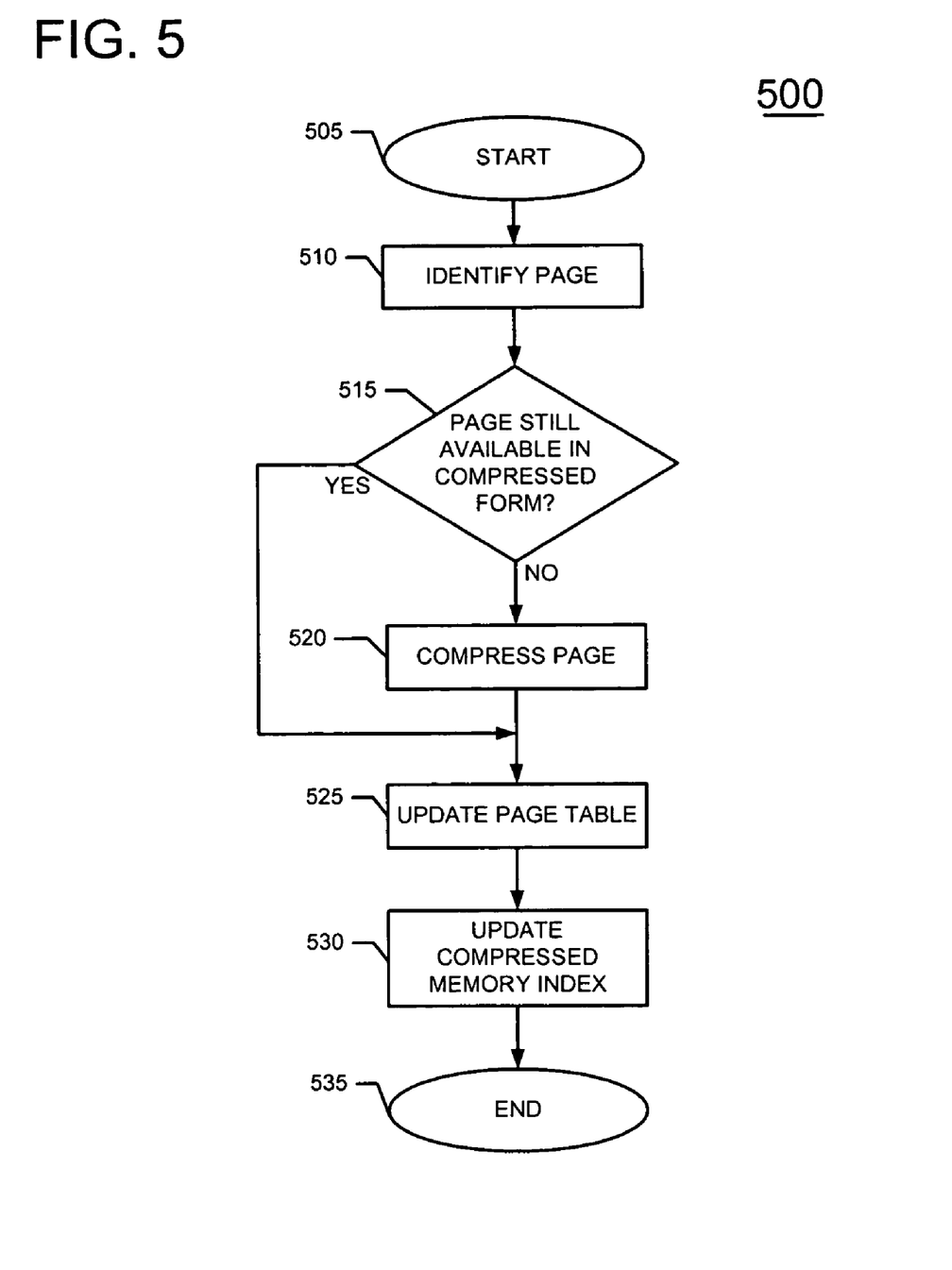
FIG. 5 shows a flowchart depicting memory compression methodology.

FIG. 5 is a flowchart that provides more detail regarding the compression of data to make space available in uncompressed memory block 500 of the flowchart of FIG. 4. Process flow commences at start block 505. PPE 110 or SPE 121 identifies the page that stores the requested information, as per block 510. PPE 110 or SPE 121 performs a test to determine if the requested page is still available in compressed format, as per decision block 515. If the requested page is no longer available in compressed format, then SPE 121 compresses the requested page according to a predetermined compression algorithm, as per block 520. PPE 110 or SPE 121 then updates page table 215 to show that uncompressed memory 210 does not store the requested page, but rather compressed memory 205 stores the requested page in compressed form. If decision block 515 found that the requested page is still available in compressed form, process flow moves directly to the update page table task of block 525. PPE 110 or SMPE 121 then updates the compressed memory index to indicate that compressed memory 205 now contains the requested page in compressed form. The compression process ends at end block 535.

Figure 6A:
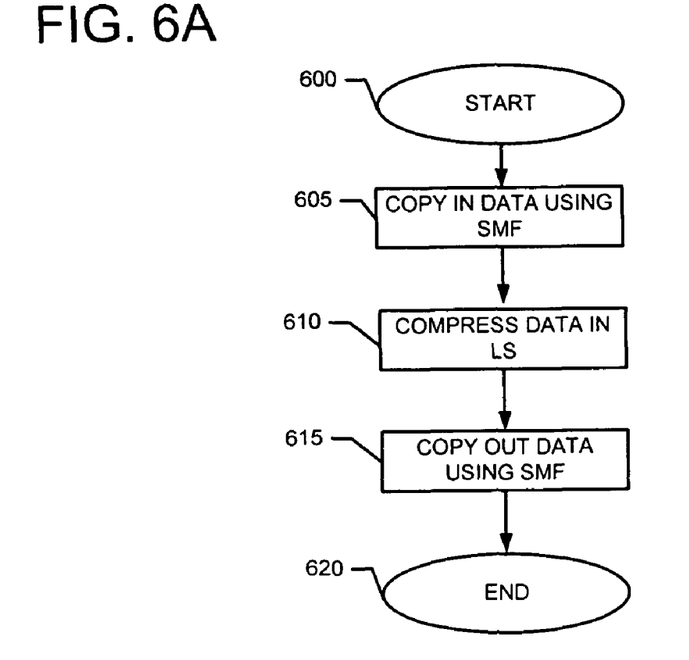
FIG. 6A shows a flowchart that provides additional detail with respect to one method of compressing information.

FIG. 6A is a flowchart that provides additional detail with respect to one method wherein an SPE compresses information. This approach is especially useful in situations where an SPE can not directly efficiently access information contained in system memory 200. The method begins at start block 600. This method assumes that PPE 110 or another component of processor 105 instructs SPU 121 to compress information stored in a page of uncompressed memory 210. In response, SMF 158 copies the requested memory page from uncompressed memory 210 to local store (LS) 157 in SPU 155 of SPE 121, as per block 605. This is a "copy in" operation. Once SMF 158 stores the requested page in LS 157, SPU 155 in SPE 121 compresses the entire page thus forming a compressed page, as per block 610. SMF 158 then sends the compressed page back to memory 200 for storage in compressed memory 205, as per block 615. This is a "copy out" operation. The method completes at end block 620.

Figure 6B:
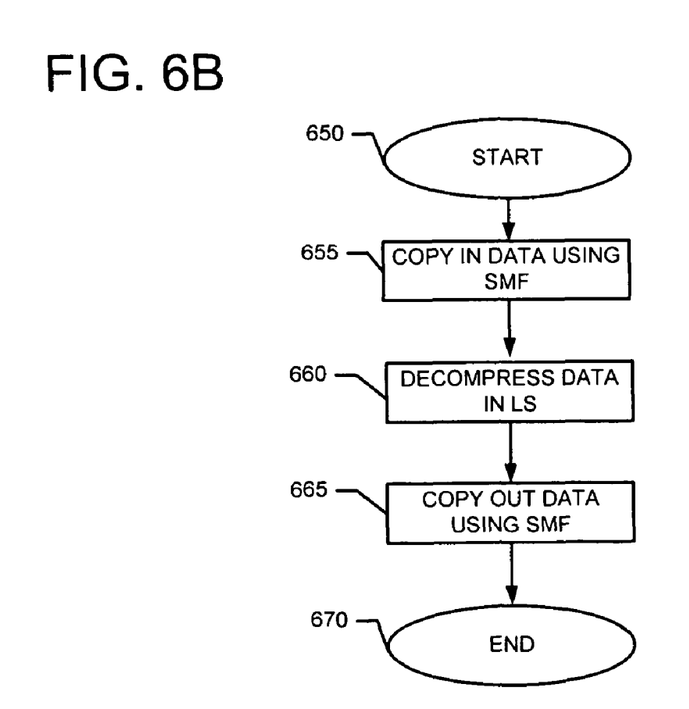
FIG. 6B shows a flowchart that provides additional detail with respect to one method of decompressing information.

FIG. 6B is a flowchart that provides additional detail with respect to one method wherein an SPE decompresses information. The method begins at start block 650. This method assumes that PPE 110 or other component of processor 105 instructs SPE 121 to decompress information stored in a page of compressed memory 205. In response, SMF 158 copies the requested compressed memory page from compressed memory 205 to local store (LS) 157 in SPU 155 of SPE 121, as per block 655. This is a "copy in" operation. Once SMF 158 stores the requested compressed page in LS 157, SPU 155 in SPE 121 decompresses the entire page thus forming an uncompressed page, as per block 660. SMF 158 then sends the uncompressed page back to memory 200 for storage in uncompressed memory 210, as per block 665. This is a "copy out" operation. The method completes at end block 670.

One embodiment of the disclosed IHS provides an adjustable ratio between the amount of compressed memory space and the amount of uncompressed memory space in system memory 200. IHS 100 may adjust the ratio of the amount of compressed information stored in system memory 200 vs. the amount of uncompressed information stored in system memory 200 by rebooting IHS 100 and moving the boundary 220 between compressed memory 205 and uncompressed memory 210 during the initialization of the IHS. This boundary adjustment is static in the sense that it occurs during a fixed period in time, namely system configuration during initialization. However it is also possible to dynamically change boundary 220 and the ratio between the amount of compressed information and the amount of uncompressed information in system memory 200.

Figure 7:
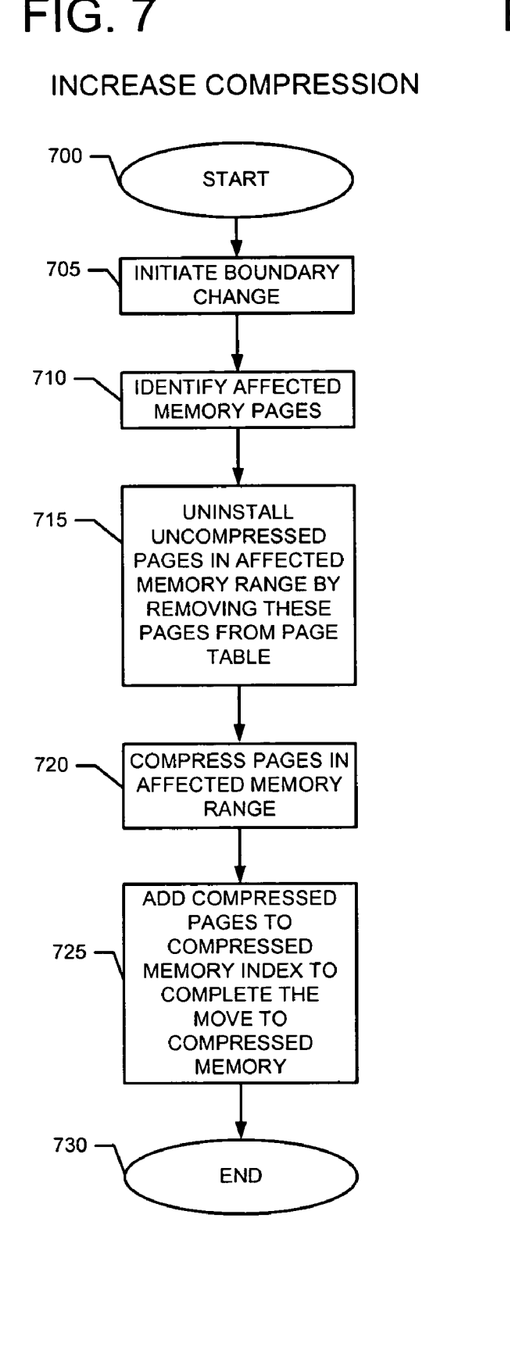
FIG. 7 shows a flowchart of methodology for dynamically modifying the ratio of compressed memory to uncompressed memory to increase compression.
Figure 8:
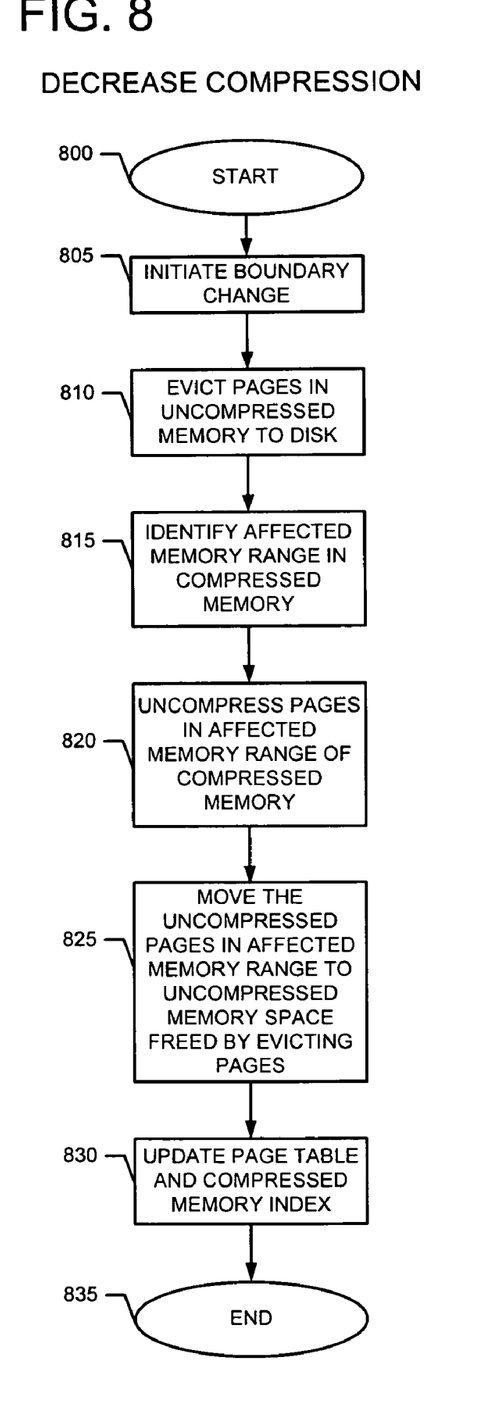
FIG. 8 shows a flowchart of methodology for dynamically modifying the ratio of compressed memory to uncompressed memory to decrease compression.

FIGS. 7 and 8 are flowcharts showing methodology for dynamically modifying the ratio between compressed memory 205 and uncompressed memory 210. As noted above, in one embodiment, IHS 100 stores compressed information and uncompressed information in a common memory area, namely system memory 200. IHS 100 may dynamically move boundary 220 at arbitrary points in time and adjust the ratio of compressed information to uncompressed information that system memory 200 stores.

More particularly, FIG. 7 is a flowchart showing methodology for dynamically increasing or expanding the compressed memory area 105. In this approach, the method involves moving memory boundary 220 to increase the size of compressed memory 205 relative to the size of uncompressed memory 210. In this embodiment, SPE 121 compresses pages previously in uncompressed memory 210 and moves the pages thus compressed to compressed memory 205. This embodiment increases the ratio of compressed information to uncompressed information in system memory 200. This action corresponds to moving boundary 220 lower in the representation of system memory 200 shown in FIG. 2. Returning to FIG. 7, process flow begins at start block 700. A user may initiate a change of boundary 220 to increase the amount of compressed information stored in system memory 200, as per block 705. Alternatively, software or hardware in IHS 100 may monitor and determine that the amount of system memory available is too low, and in response determine that the boundary location should change to increase the amount of compressed information. Next, processor 105 determines which memory page or pages that the move of boundary 220 affects, as per block 710. In one embodiment, either PPE 110 or SPE 121 handles these decision making steps. PPE 110 or SPE 121 then uninstalls the uncompressed memory pages from the affected memory range, by removing the affected pages from page table 215. PPE 110 or SPE 121 then compresses the pages in the affected memory range, as per block 720. Next, PPE 110 or SPE 121 adds the newly compressed pages to the compressed memory index to complete the move of the pages in the affected memory range to compressed memory 205, as per block 730. In this manner, processor 105 dynamically increases the amount of compressed memory and the process ends at end block 730.

FIG. 8 is a flowchart showing methodology for dynamically decreasing the compressed memory area 205 and increasing uncompressed memory area 210. In this embodiment, the method involves moving memory boundary 220 to decrease the size of compressed memory 205 relative to the size of uncompressed memory 210. Process flow begins at start block 800. A user may initiate a change of boundary 220 to decrease the amount of compressed information stored in system memory 200, as per block 805. Alternatively, software or hardware in IHS 100 may initiate a decrease of the compressed memory space in response to predetermined operating conditions. PPE 110 or SPE 121 then evicts a page or pages from uncompressed memory 210 and moves such page or pages to non-volatile storage, such as media drive 164, as per block 810. PPE 110 or SPE 121 then identifies the memory range in compressed memory 205 affected by moving boundary 220 to decrease compressed memory, as per block 815. PPE 110 or SPE 121 decompresses any pages in the affected memory range of compressed memory 205, as per block 820. Then PPE 110 or SPE 121 moves these uncompressed memory pages to the uncompressed memory space freed by the earlier eviction of pages from uncompressed memory 210, as per block 825. PPE 110 or SPE 121 updates the page table 215 to reflect the revised contents of uncompressed memory 210 and updates the compressed memory index to reflect the revised contents of compressed memory 205, as per block 830. Process flow concludes at end block 835.

The foregoing discloses an information handling system that employs a heterogeneous processor with memory compression technology for increasing effective system memory space in a cost effective manner.

Modifications and alternative embodiments of this invention will be apparent to those skilled in the art in view of this description of the invention. Accordingly, this description teaches those skilled in the art the manner of carrying out the invention and is intended to be construed as illustrative only.

The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of compressing and decompressing information in a heterogeneous multi-core processor, the method comprising:

processing information by a first processor core exhibiting a first architecture, the first processor core including a first data path exhibiting a first data width;

processing information by a second processor core exhibiting a second architecture, the first processor core and the second processor core being in the same heterogeneous multi-core processor, the second processor core including a second data path, the second data path exhibiting a second data width that is wider than the width of the first data path;

compressing, by the second processor core, information to be sent by the heterogeneous multi-core processor to a system memory for storage therein as compressed information;

decompressing, by the second processor core, compressed information received from the system memory for use as uncompressed information by the heterogeneous processor, the second processor core being dedicated to compressing and decompressing operations;

storing, by the heterogeneous multi-core processor, both compressed information and uncompressed information in the system memory, the system memory including a compressed memory portion that stores the compressed information and an uncompressed memory portion that stores the uncompressed information, the system memory acting as a shared memory for both the compressed information and the uncompressed information, the system memory including a movable boundary between the compressed memory portion and the uncompressed memory portion, the movable boundary enabling changing of the ratio of the amount of compressed information in the compressed memory portion to the amount of uncompressed information in the uncompressed memory portion;

receiving, by the second processor core, a request to decompress compressed information stored in the compressed memory portion;

testing to determine if memory space is available in the uncompressed memory portion to store resultant decompressed information generated by performing the request to decompress;

compressing, by the second processor core, uncompressed information in the uncompressed memory portion to provide resultant compressed information, transferring the resultant compressed information to the compressed memory portion for storage if the testing step determines that sufficient memory space is not available in the uncompressed memory portion for the resultant decompressed information;

performing, by the second processor core, the request to decompress to generate the resultant decompressed information; and storing the resultant decompressed information in the uncompressed memory portion.

2. The method of claim 1, wherein the first architecture is a general purpose processor core and the second architecture is a special purpose processor core that performs tasks assigned by the first processor core.

3. The method of claim 1, wherein a memory flow controller in the second processor core communicates compressed information and uncompressed information to and from the system memory.

4. The method of claim 1, wherein the second processor core speculatively decompresses information in the system memory that may be needed by the first processor core, and the second processor core speculatively compresses information for storage in the system memory.

5. The method of claim 1, wherein the first processor core performs other tasks while the second processor core is compressing or decompressing information.

6. An information handling system (IHS) comprising:
a heterogeneous processor including:
a first processor core exhibiting a first architecture, the first processor core including a first data path exhibiting a first data width;
a second processor core exhibiting a second architecture that compresses information to provide compressed information and that decompresses compressed information to provide uncompressed information, the first processor core and the second processor core being situated in the same heterogeneous multi-core processor, the second processor core including a second data path, the second data path exhibiting a second data width that is wider than the width of the first data path;
a bus coupling the first processor core to the second processor core; and
a system memory, coupled to the heterogeneous processor, that stores the compressed information and the uncompressed information, the system memory acting as a shared memory that stores both the compressed information and the uncompressed information, the system memory including a compressed memory portion that stores the compressed information and an uncompressed memory portion that stores the uncompressed information, the system memory including a movable boundary between the compressed memory portion and the uncompressed memory portion, the movable boundary enabling changing of the ratio of the amount of compressed information in the compressed memory portion to the amount of uncompressed information in the uncompressed memory portion ;
the second processor core being dedicated to compressing and decompressing operations, the second processor core being configured to:
receive a request to decompress compressed information stored in the compressed memory portion;
test to determine if memory space is available in the uncompressed memory portion to store resultant decompressed information generated by performing the request to decompress;
compress uncompressed information in the uncompressed memory portion to provide resultant compressed information and transfer the resultant compressed information to the compressed memory portion for storage if the test determines that sufficient memory space is not available in the uncompressed memory portion for the resultant decompressed information;
perform the request to decompress to generate the resultant decompressed information; and
store the resultant decompressed information in the uncompressed memory portion.

7. The IHS of claim 6, wherein the first architecture is a general purpose processor core and the second architecture is a special purpose processor core that performs tasks assigned by the first processor core.

8. The IHS of claim 6, wherein the second processor core speculatively decompresses information in the system memory that may be needed by the first processor core, and the second processor core speculatively compresses information for storage in the system memory.

* * * * *